United States Patent
Chin et al.

(10) Patent No.: US 9,897,804 B2
(45) Date of Patent: Feb. 20, 2018

(54) LIQUID CRYSTAL LENS

(71) Applicant: SILICON TOUCH TECHNOLOGY INC., Hsinchu (TW)

(72) Inventors: Chi-Yuan Chin, Hsinchu (TW); Lin Ping Zhang, Hsinchu (TW); Yong Cao, Hsinchu (TW)

(73) Assignee: SILICON TOUCH TECHNOLOGY INC., Hsinchu (TW)

( * ) Notice: Subject to any disclaimer, the term of this patent is extended or adjusted under 35 U.S.C. 154(b) by 16 days.

(21) Appl. No.: 14/678,335

(22) Filed: Apr. 3, 2015

(65) Prior Publication Data

US 2015/0293353 A1    Oct. 15, 2015

(30) Foreign Application Priority Data

Apr. 11, 2014   (TW) .............................. 103113383 A

(51) Int. Cl.
*G02F 1/13*     (2006.01)
*G02B 27/00*    (2006.01)
(Continued)

(52) U.S. Cl.
CPC ... *G02B 27/0075* (2013.01); *G02F 1/134309* (2013.01); *G02F 1/29* (2013.01); *G02F 2001/294* (2013.01)

(58) Field of Classification Search
CPC ............... G02B 27/0075; G02F 1/1337; G02F 1/133345; G02F 1/134309; G02F 1/29; G02F 2001/294
(Continued)

(56) References Cited

U.S. PATENT DOCUMENTS

2006/0198760 A1   9/2006   Potyrailo et al.
2009/0268152 A1  10/2009   Chen
(Continued)

FOREIGN PATENT DOCUMENTS

CN   101566749 A   10/2009
CN   102812393 A   12/2012
(Continued)

OTHER PUBLICATIONS

Korean Patent Office, Office action dated Oct. 8, 2015.

*Primary Examiner* — Charles Chang
(74) *Attorney, Agent, or Firm* — Li & Cai Intellectual Property (USA) Office

(57) ABSTRACT

A crystal lens includes a liquid crystal layer, a pair of alignment layers, a first electrode set, and a second electrode set. The alignment layers are positioned on different sides of the liquid crystal layer. The first and second electrode sets are positioned on different alignment layers. The first electrode set includes a first transparent insulating layer and a first electrode layer. The first electrode set attaches to one of the alignment layers. The second electrode set includes a second transparent insulating layer, a second electrode layer, and a dielectric film. The second electrode layer includes a hole-patterned electrode. The dielectric film attaches to the first transparent insulating layer. The hole-patterned electrode exposes the dielectric film. In addition, an external power supply provides a driving voltage to the hole-patterned electrode and the first electrode layer, so that the liquid crystal molecules inside the liquid crystal layer drive rotation.

9 Claims, 9 Drawing Sheets

(51) Int. Cl.
*G02F 1/1343* (2006.01)
*G02F 1/29* (2006.01)

(58) Field of Classification Search
USPC .......................................................... 349/200
See application file for complete search history.

(56) References Cited

U.S. PATENT DOCUMENTS

| | | | |
|---|---|---|---|
| 2010/0296013 | A1 | 11/2010 | Hung et al. |
| 2012/0257131 | A1* | 10/2012 | Galstian ............ G02F 1/134309 349/36 |
| 2013/0088682 | A1* | 4/2013 | Liu .......................... G02B 3/14 349/200 |
| 2014/0340624 | A1* | 11/2014 | Kadomi .................... G02F 1/29 349/139 |
| 2015/0268387 | A1 | 9/2015 | Kadomi et al. |

FOREIGN PATENT DOCUMENTS

| | | |
|---|---|---|
| CN | 103492935 A | 1/2014 |
| JP | 5-53089 A | 3/1993 |
| JP | H 0553089 A | 3/1993 |
| JP | 9-329704 A | 12/1997 |
| JP | 2002-372701 A | 12/2002 |
| JP | 2006293241 A | 10/2006 |
| JP | 2010-271719 A | 12/2010 |
| JP | 2012083459 A | 4/2012 |
| JP | 2013083916 A | 5/2013 |
| JP | 2013515969 A | 5/2013 |
| JP | 2013178494 A | 9/2013 |
| TW | 201001013 A1 | 1/2010 |
| TW | 201042336 A1 | 12/2010 |
| TW | M478831 U | 5/2014 |
| WO | WO 2011/075834 A1 | 6/2011 |
| WO | WO2012079178 A1 | 6/2012 |
| WO | WO 2013061729 A1 | 5/2013 |

\* cited by examiner

LIQUID CRYSTAL LENS

BACKGROUND OF THE INVENTION

1. Field of the Invention

The instant disclosure relates to a lens; in particular, to a liquid crystal lens.

2. Description of Related Art

Liquid crystal lens is a focal length variable lens. Typically, liquid crystal lens includes a liquid crystal layer, a pair of alignment layers, and a pair of electrode layers. The alignment layer is located on two sides of the liquid crystal layer while the electrode layer is separately located on two side of the alignment layer.

When in use, external circuits apply driving voltage to the electrode layers, so that an electric field is generated between the electrode layers on the two sides of the liquid crystal layer. The electric filed can control the deflection of the liquid crystal molecules in the liquid crystal layer, such that the overall arrangement of the liquid crystal molecules provides effects resembling an optical lens. When light passes through the liquid crystal lens, light will be affected by the overall arrangement of the liquid crystal molecules, and thus providing optical effects such as focusing or diverging.

To address the above issues, the inventor strives via associated experience and research to present the instant disclosure, which can effectively improve the limitation described above.

SUMMARY OF THE INVENTION

The object of the instant disclosure is to liquid crystal lens which controls the rotation of the liquid crystal molecules through the design of electrode layers.

In order to achieve the aforementioned objects, according to an embodiment of the instant disclosure, a liquid crystal lens is provided. The liquid crystal lens includes a liquid crystal layer, a pair of alignment layers, a first electrode set, and a second electrode set. The pair of alignment layers is arranged at two lateral sides of the liquid crystal layer. The first electrode set includes a first transparent insulating layer and a first electrode layer. The first electrode set is attached to one of the alignment layers, and the alignment layer is arranged between the liquid crystal layer and the first electrode set. The second electrode set includes a second transparent insulating layer, a second electrode layer, and a dielectric film. The second electrode layer includes a hole-patterned electrode. The dielectric film is attached to the first transparent insulating layer, the hole-patterned electrode exposes the dielectric film, and the second transparent insulating layer is arranged between the second electrode layer and the other alignment layer. Moreover, an external power supply provides a driving voltage to the hole-patterned electrode and the first electrode layer to drive the rotation of the liquid crystal molecules in the liquid crystal layer.

Another liquid crystal lens of the instant disclosure includes a liquid crystal layer, a pair of alignment layers, a first electrode set, and a second electrode set. The pair of alignment layers is arranged at two lateral sides of the liquid crystal layer. The first electrode set includes a first transparent insulating layer and a first electrode layer. The first electrode set is attached to one of the alignment layers, and the alignment layer is arranged between the liquid crystal layer and the first electrode set. The second electrode set includes a second transparent insulating layer and a second electrode layer. The second electrode layer includes a hole-patterned electrode, a plurality of annular electrodes, and a circular electrode. The hole-patterned electrode, the plurality of annular electrodes, and the circular electrode are concentrically arranged and are electrically insulated from one another. The second transparent insulating layer is arranged between the second electrode layer and the other alignment layer. Moreover, an external power supply provides a driving voltage to the hole-patterned electrode and the first electrode layer to drive the rotation of the liquid crystal molecules in the liquid crystal layer.

In summary, a liquid crystal lens of the instant disclosure includes a first electrode set, a second electrode set, and a liquid crystal layer. Electrode layer of the second electrode set includes a hole-patterned electrode, a plurality of annular electrodes, and a dielectric film. An external power supply only needs to provide driving voltage to the hole-patterned electrode and the first electrode set in order to generate electric field between the hole-patterned electrode and the first electrode set, and drive rotations of the liquid crystal molecules. The plurality of annular electrodes can induce electric field, whereas the dielectric film has a high dielectric constant to stabilize the electric field distribution, such that liquid crystal molecules can provide preferable optical lens effects.

In order to further understand the instant disclosure, the following embodiments and illustrations are provided. However, the detailed description and drawings are merely illustrative of the disclosure, rather than limiting the scope being defined by the appended claims and equivalents thereof.

DETAILED DESCRIPTION OF THE PREFERRED EMBODIMENTS

Figure 1A:
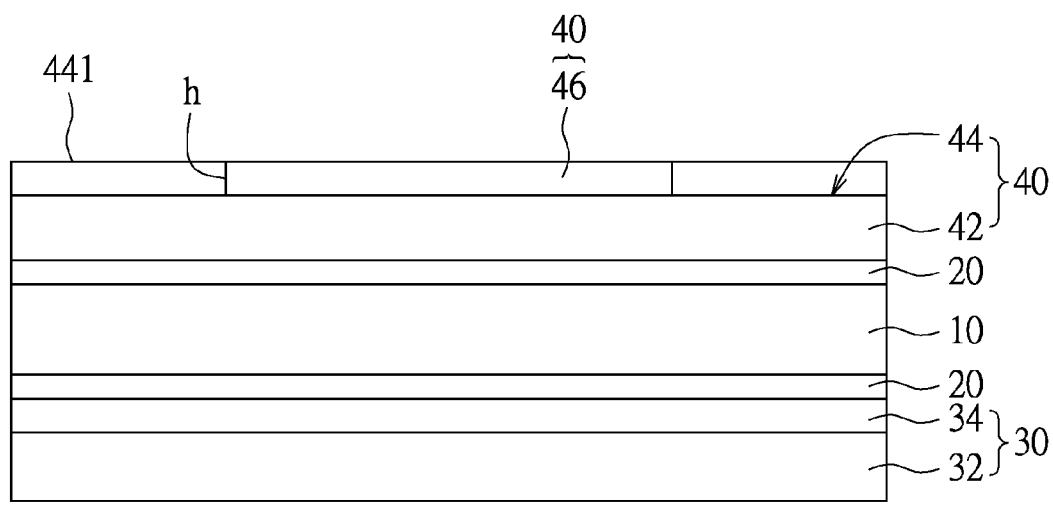
FIGS. 1A and 1B are schematic diagrams of a crystal liquid lens in accordance with a first embodiment of the instant disclosure.
Figure 1B:
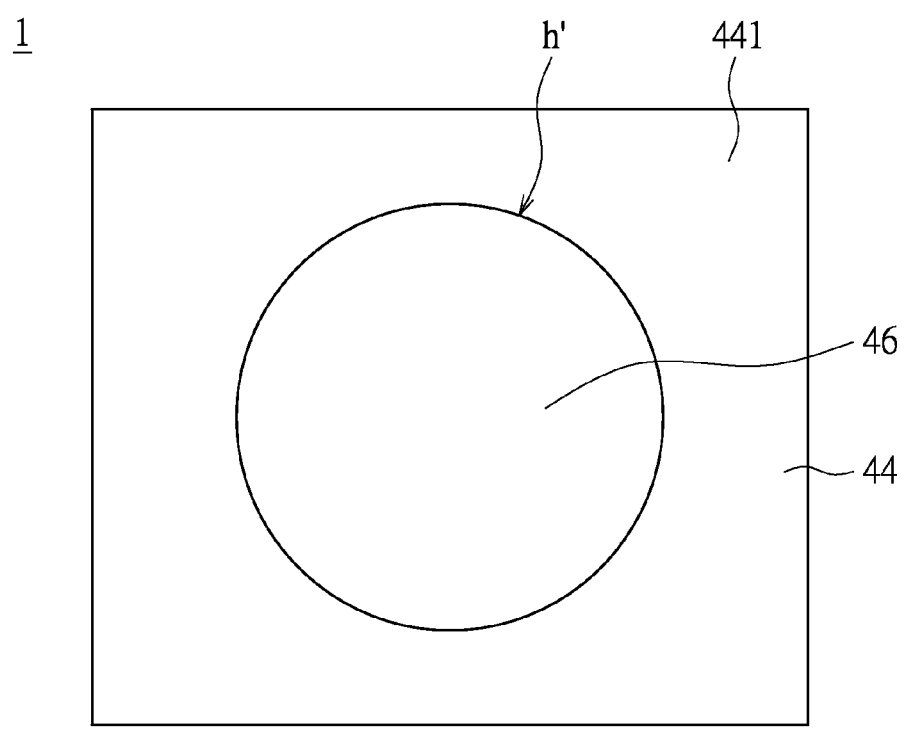

Please refer to FIGS. 1A and 1B as schematic diagrams of a crystal liquid lens 1 in accordance with a first embodiment of the instant disclosure. FIG. 1A is a cross-sectional view of the liquid crystal lens 1 while FIG. 1B is a top view of the liquid crystal lens 1. As shown in FIG. 1A, the liquid crystal lens 1 includes a liquid crystal layer 10, a pair of alignment layers 20, a first electrode set 30, and a second electrode set 40. The alignment layers 20 are arranged on two lateral sides of the liquid crystal layer 10. The first and second electrode sets 30, 40 are respectively arranged on the two alignment layers 10. In order words, one of the alignment layers 20 is arranged between the first electrode set 30 and the liquid crystal layer 10, and the other alignment layer 20 is arranged between the second electrode set 40 and the liquid crystal layer 10.

Specifically, the first electrode set 30 includes a first transparent insulating layer 32 and a first electrode layer 34. The first electrode layer 34 is arranged between the alignment layer 20 and the first transparent insulating layer 32. Moreover, the second electrode set 40 further includes a second transparent insulating layer 42, a second electrode layer 44, and a dielectric film 46. The second transparent insulating layer 42 is attached onto the alignment layer 20, whereas the second electrode layer 44 and the dielectric film 46 is attached onto the second transparent insulating layer 42. In other words, the second transparent insulating layer 42 is arranged between the second electrode layer 44 and the alignment layer 22.

Please refer to FIGS. 1A and 1B. The second electrode layer 44 includes a hole-patterned electrode 441 has portions defining an opening h. The opening h exposes the dielectric film 46. In the instant embodiment, the dielectric film 46 can be made of materials such as titanium dioxide or barium zirconate titanate. The dielectric film 46 has a dielectric constant ranging from 400 to 1000, but is not limited herein. The materials of the dielectric film can be made of materials having relatively high dielectric constant, as long as the materials have relatively high light transmission in the visible light range.

The liquid crystal lens 1 can also include an external power supply (not shown in figures) which provides driving voltages to the first electrode layer 34 and the hole-patterned electrode 441 such that an electrical field is generated between the first electrode layer 34 and the hole-patterned electrode 441. The electric field progressively reduces from the circumference of the opening h towards the center of the opening. The generated electric field drives the liquid crystal molecules in the liquid crystal layer 10 into a rotational arrangement, such that the liquid crystal molecules produce effects resembling an optical lens.

Notably, the dielectric film 46 has a relatively high dielectric constant which can slow down the electric field from progressively reducing from the circumference of the opening h towards the center of the opening and stabilize the electrical field distribution. Furthermore, in the instant embodiment, the dielectric film 46 and second electrode layer 44 are arranged in the same plane and attached on top of the second transparent insulating layer 42. However, in another embodiment, the dielectric film can also be arranged on and attached to the second transparent insulating layer, whereas the second electrode layer is attached on the dielectric layer, and the hole-patterned electrode exposing the dielectric layer. The physical position of the dielectric film is not limited to the examples provided herein, as long as the dielectric film is arranged proximate to while attached to the second electrode layer and slows down the progressive reduction in electrical field.

Notably, the first transparent insulating layer 32 and the second transparent insulating layer 42 each has a thickness of 0.145 mm, the liquid crystal layer 10 has a thickness of 30 micron (μm), whereas the first electrode layer 34 and the second electrode layer 44 each has a thickness of 10 micron (μm) in the instant embodiment. Moreover, the opening h has a diameter of 2.3 mm. However, the diameter of the opening h, the thicknesses of the first transparent insulating layer 32, the second transparent insulating layer 42, and the liquid crystal layer 10 are not limited hereto. While the examples aforementioned serve as the preferred embodiment, the referenced dimensions do not intent to limit the scope of the instant disclosure.

Figure 2A:
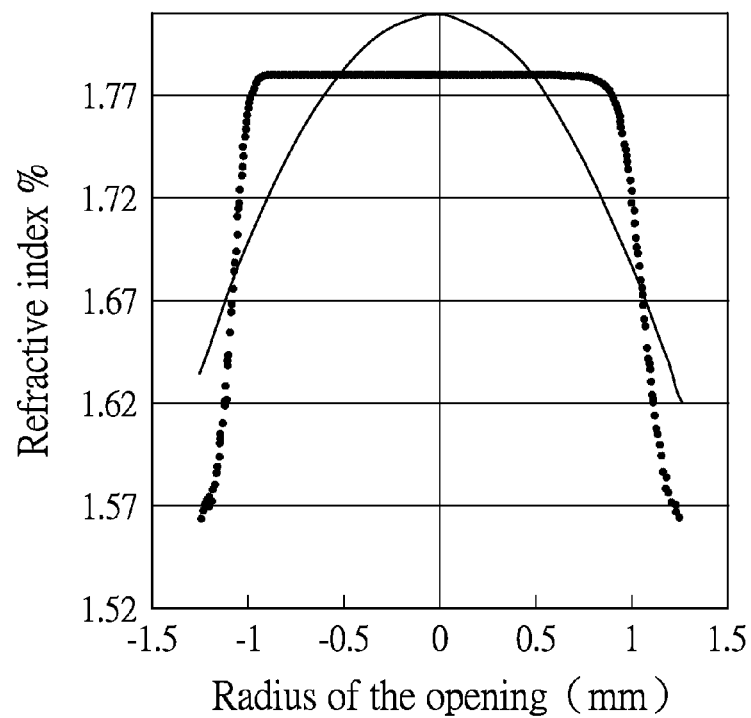
FIGS. 2A to 2G are curve fitting diagrams of the crystal liquid lens illustrating the degree of rotation of the liquid crystal molecules with respect to electric field distribution in accordance with the first embodiment of the instant disclosure.
Figure 2B:
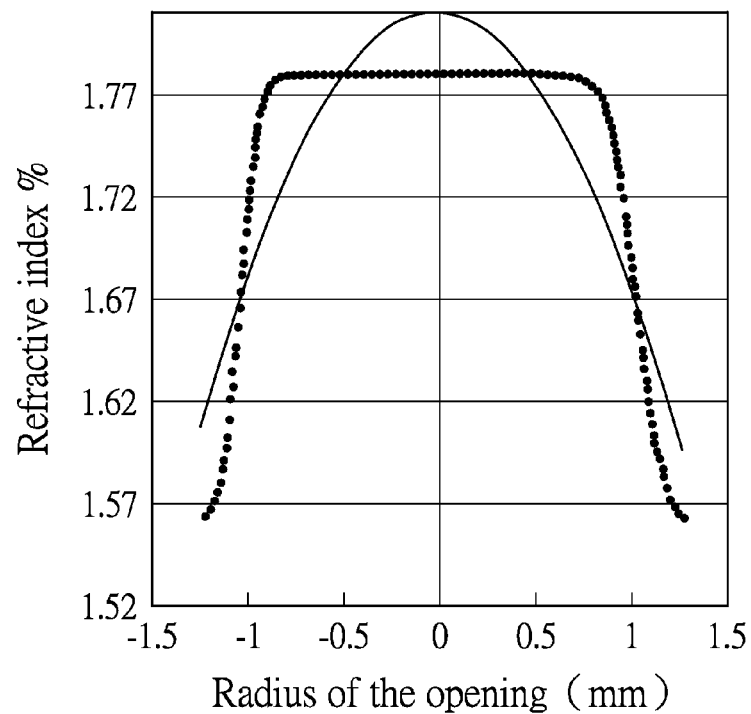
Figure 2C:
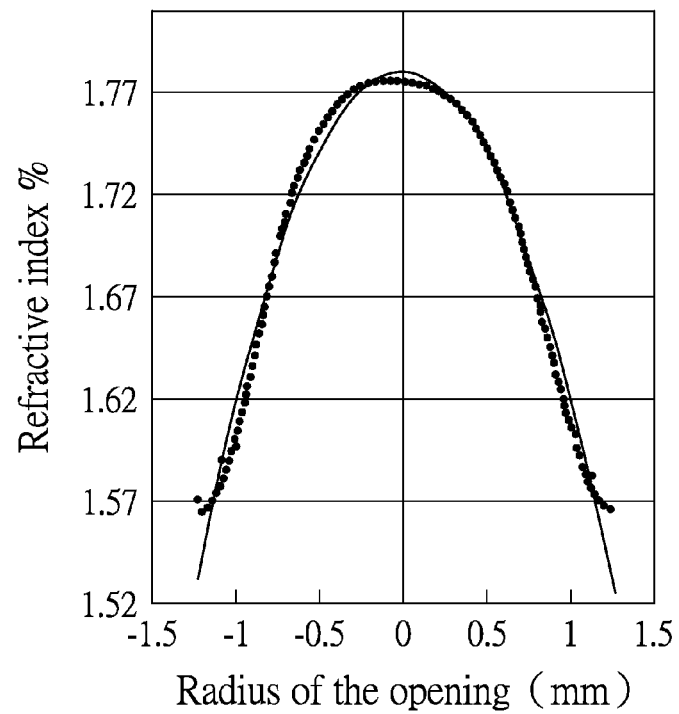
Figure 2D:
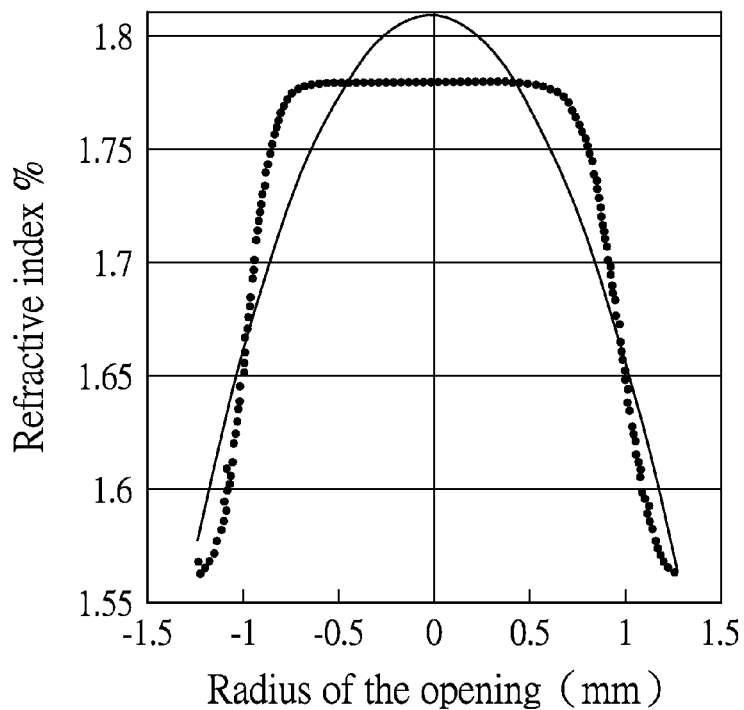
Figure 2E:
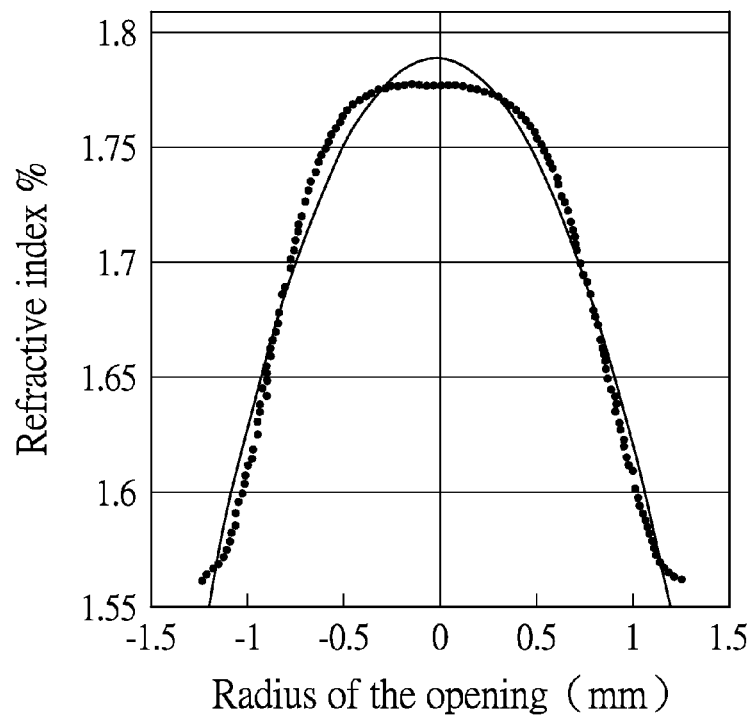
Figure 2F:
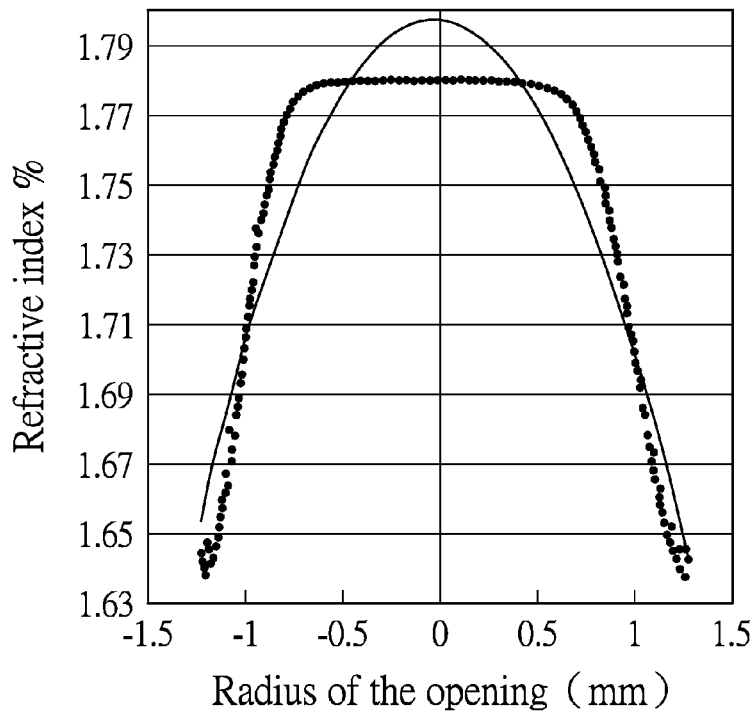
Figure 2G:
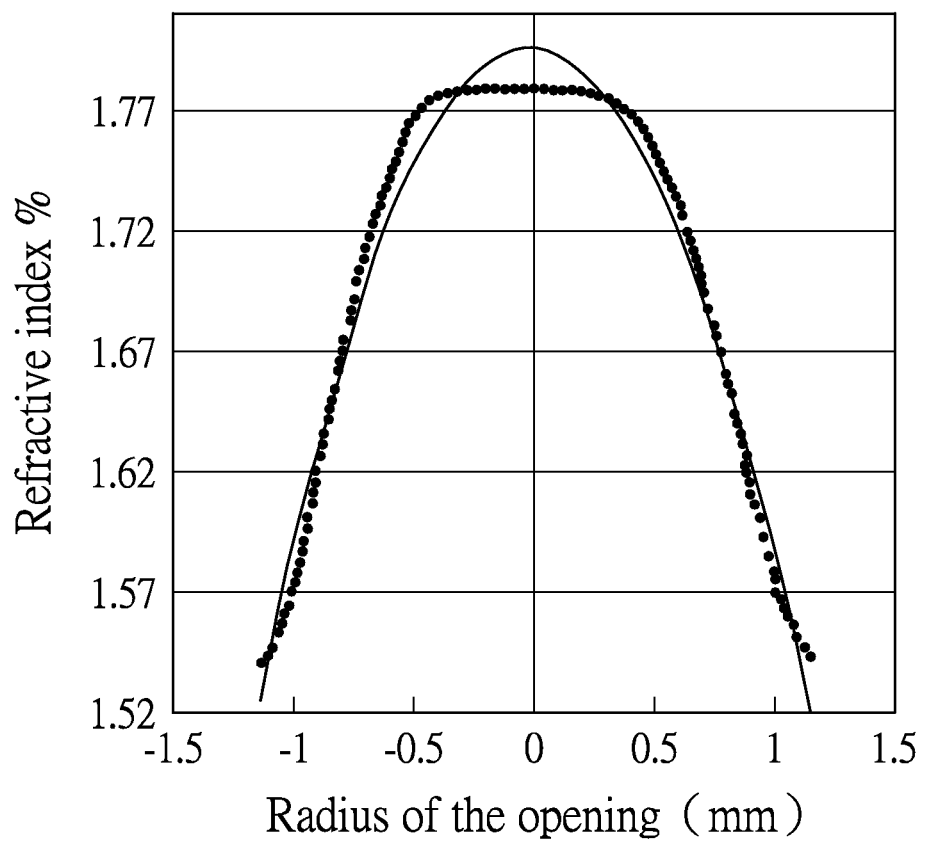

Following discloses refractive index distribution of the liquid crystal molecules with respect to various parameters including the aforementioned layer thicknesses and diameter of the opening h. FIGS. 2A to 2G are curve fitting diagrams of the crystal liquid lens illustrating the degree of rotation of the liquid crystal molecules with respect to electric field distribution in accordance with the first embodiment of the instant disclosure. FIGS. 2A to 2C shows the extend of rotation of the liquid crystal molecules with respect to the electrical field distribution curve fitting diagram when the liquid crystal lens 1 has dielectric films 46 of various dielectric constant. FIGS. 2D to 2E shows the extend of rotation of the liquid crystal molecules with respect to the electrical field distribution curve fitting diagram when the liquid crystal lens 1 has different thicknesses. FIGS. 2F to 2G shows the extend of rotation of the liquid crystal molecules with respect to the electrical field distribution curve fitting diagram when various driving voltages are applied to the liquid crystal lens 1.

Please refer to FIGS. 2A to 2C. The thickness of the dielectric layer 46 is 2.5 μm, whereas the external power supply applies 0V of voltage to the first electrode layer 34 and 25V of voltage to the hole-patterned electrode 441. Refractive index distribution of the liquid crystal molecules in the liquid crystal lens 1 illustrates a quadric curve with a degree of fitting at 0.6. In other words, the liquid crystal lens 1 possesses light focusing effects similar to that of a convex lens.

Specifically, FIG. 2A shows the refractive index distribution of the liquid crystal molecules as the dielectric constant of the dielectric film 46 is 1, whereas the degree of fitting at 0.689. FIG. 2B shows the refractive index distribution of the liquid crystal molecules as the dielectric constant of the dielectric film 46 is 100, whereas the degree of fitting at 0.7752. FIG. 2C shows the refractive index distribution of the liquid crystal molecules as the dielectric constant of the dielectric film 46 is 2000, whereas the degree of fitting at 0.9828. As demonstrated in FIGS. 2A to 2C, the larger the dielectric constant, the degree of fitting for the refractive index distribution of the liquid crystal molecules also becomes higher. In other words, higher the dielectric constant of the dielectric film 46, the liquid crystal lens 1 demonstrates more preferred lens effects.

Please refer to FIGS. 2D and 2E. The dielectric constant of the dielectric film 46 is 400. The external power supply supplied 0V of voltage to the first electrode layer 34 and 25V of voltage to the hole-patterned electrode 441. As shown in FIGS. 2D and 2E, the refractive index distribution of the liquid crystal molecules in the liquid crystal lens 1 illustrates a quadric curve, which resembles the light focusing effects of a convex lens. Specifically, FIG. 2D shows that when the thickness of the dielectric film 46 is 2.5 μm, the refractive index distribution of the liquid crystal molecules has the degree of fitting at 0.8776. FIG. 2E shows that when the thickness of the dielectric film 46 is 10 μm, the refractive index distribution of the liquid crystal molecules has the degree of fitting at 0.9789. As demonstrated in FIGS. 2D to 2E, the larger the thickness of the dielectric film 46, the degree of fitting for the refractive index distribution of the liquid crystal molecules becomes higher. In other words, the liquid crystal lens 1 demonstrates more preferred lens effects. However, in practice, the thickness of the dielectric film 46 is controlled to be approximately less than or equal to the thickness of the second electrode layer 44. In the instant embodiment, the thickness of the dielectric film 46 is controlled to be ranging from 2.5 to 10 μm Please refer to FIGS. 2F and 2G. The dielectric constant of the dielectric film 46 is 1000, whereas the thickness of the dielectric film is 2.5 μm. As demonstrated in FIGS. 2F to 2G, the refractive index distribution of the liquid crystal molecules in the liquid crystal lens 1 illustrates a quadric curve. In other words, the liquid crystal lens 1 possesses light focusing effects similar to that of a convex lens. Specifically, as shown in FIG. 2F, the external power supply supplied 0V of voltage to the first electrode layer 34 and 15V of voltage to the hole-patterned electrode 441, the refractive index distribution of the liquid crystal molecules has the degree of fitting at 0.891. In FIG. 2G, the external power supply supplied 0V of voltage to the first electrode layer 34 and 35V of voltage to the hole-patterned electrode 441, the refractive index distribution of the liquid crystal molecules has the degree of fitting at 0.9801. As demonstrated in FIGS. 2F to 2G, the larger the applied voltage to the hole-patterned electrode 441, the degree of fitting for the refractive index distribution of the liquid crystal molecules becomes higher. In other words, the liquid crystal lens 1 demonstrates more preferred lens effects.

Figure 3A:
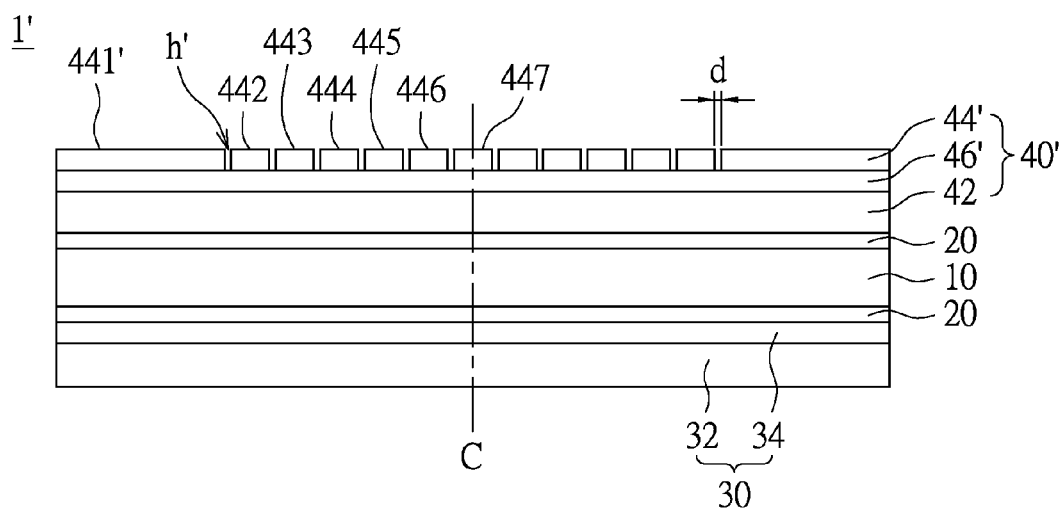
FIGS. 3A and 3B are schematic diagrams of the crystal liquid lens in accordance with a second embodiment of the instant disclosure.
Figure 3B:
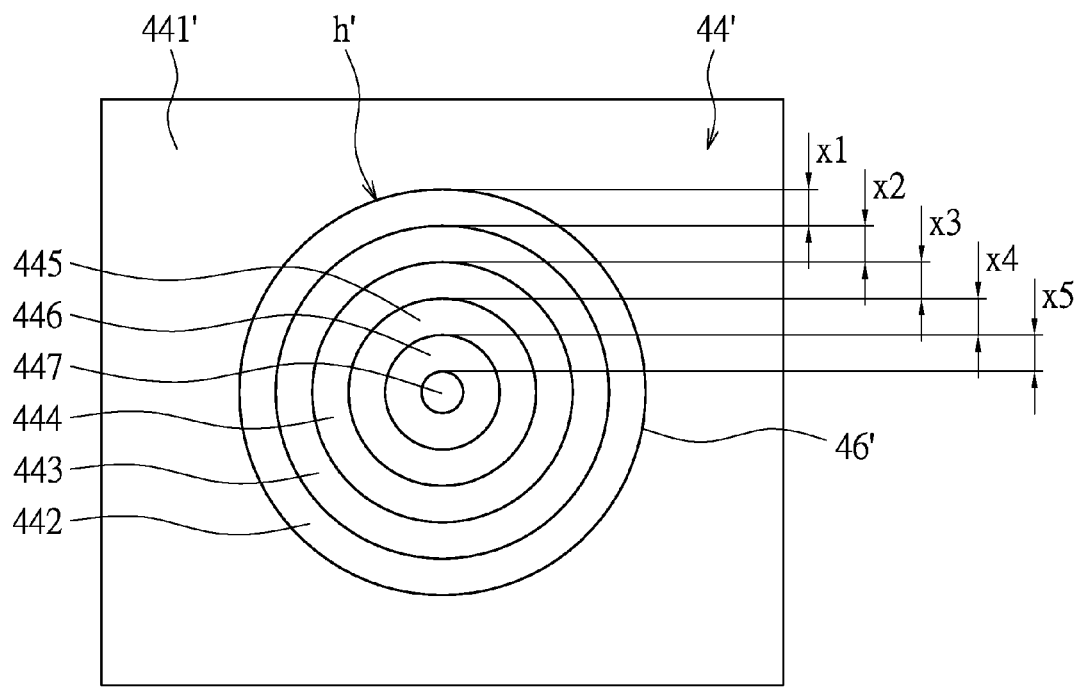

FIGS. 3A and 3B are schematic diagrams of the crystal liquid lens in accordance with a second embodiment of the instant disclosure. FIG. 3A is a cross-sectional view of the liquid crystal lens 1', and FIG. 3B is a top view of the liquid crystal lens 1'. In FIG. 3A, the liquid crystal lens 1' is substantially the same as in the first embodiment, which also includes liquid crystal layer 10, a pair of alignment layer 20, a first electrode set 30, and a second electrode set 40'. The first electrode set 30 also includes a first transparent insulating layer 32 and a first electrode layer 34. Moreover, the corresponding arrangement of each layer, thickness and materials of the layers, parameters, etc. are similar to that of the previous embodiments, and are not disclosed further.

However, the second electrode set 40' of the liquid crystal lens 1 differs from the previous embodiment, in which the dielectric film 46' is arranged between the second electrode layer 44' and the second transparent insulating layer 42, whereas the second electrode layer 44' is attached on the dielectric film 46'. Furthermore, the second electrode layer 44' further includes the hole-patterned electrode 441', the first annular electrode 442, the second annular electrode 443, the third annular electrode 444, the fourth annular electrode 445, the fifth annular electrode 446, and the circular electrode 447. The hole-patterned electrode 441', the first annular electrode 442, the second annular electrode 443, the third annular electrode 444, the fourth annular electrode 445, the fifth annular electrode 446, and the circular electrode 447 are electrically insulated from one another and are concentric with respect to a center C. The hole-patterned electrode 441' has portions defining an opening h'. Five annular electrodes are disclosed in the instant embodiment. However, the number of annular electrodes can be from one to six or more, and is not limited to the examples provided herein.

Please refer to FIGS. 3A and 3B. The first annular electrode 442, the second annular electrode 443, the third annular electrode 444, the fourth annular electrode 445, and the fifth annular electrode 446 are concentrically arranged in the hole-patterned electrode 441', whereas the circular electrode 447 is arranged in the fifth annular electrode 446. Moreover, the external power supply provides driving voltages to the first electrode layer 34 and the hole-patterned electrode 441', such that an electric field is generated between the first electrode layer 34 and the hole-patterned electrode 441'. The strength of the electric field progressively reduces from the circumference towards the center C of the opening h'.

Furthermore, the first annular electrode 442 generates an induced electric field due to the electric field of the hole-patterned electrode 441'. The second annular electrode 443 successively generates another induced electric field due to the electric field of the first annular electrode 442, and so on. As a result, the first annular electrode 442, the second annular electrode 443, the third annular electrode 444, the fourth annular electrode 445, the fifth annular electrode 446, and the circular electrode 447 will all respectively generate an induced electric field. Notably, the first annular electrode 442, the second annular electrode 443, the third annular electrode 444, the fourth annular electrode 445, the fifth annular electrode 446, and the circular electrode 447 can generate an induced electric field via the hole-patterned electrode 441' by induction. In other words, the first annular electrode 442, the second annular electrode 443, the third annular electrode 444, the fourth annular electrode 445, the fifth annular electrode 446, and the circular electrode 447 are floating. External power supply needs not actually provide separate driving voltage to the first annular electrode 442, the second annular electrode 443, the third annular electrode 444, the fourth annular electrode 445, the fifth annular electrode 446, and the circular electrode 447.

Besides the inducted electric field, dielectric film 46' having higher dielectric constant can also slow down the electric field from progressively reducing from the circumference of the opening h' towards the center. In other words, the annular electrode and the dielectric film can stabilize electric field distribution such that liquid crystal molecules can provide most preferred optical lens effects.

Please refer to FIG. 3B. Opening h' has a diameter of 2.3 mm in the instant embodiment. Moreover, the first annular electrode 442 has a first width x1, the second annular electrode 443 has a second width x2, the third annular electrode 444 has a third width x3, the fourth annular electrode 445 has a fourth width x4, the fifth annular electrode 446 has a fifth width x5. Each width ranges from 0.1 to 0.25 mm, which is also the diameter of the circular electrode 447. The hole-patterned electrode 441' and the first annular electrode 442 has a gap d therebetween ranging from 5 to 50 μm. A gap d also exists between every two neighboring annular electrodes as well as between the circular electrode 447 and the adjacent fifth annular electrode 446.

Figure 4A:
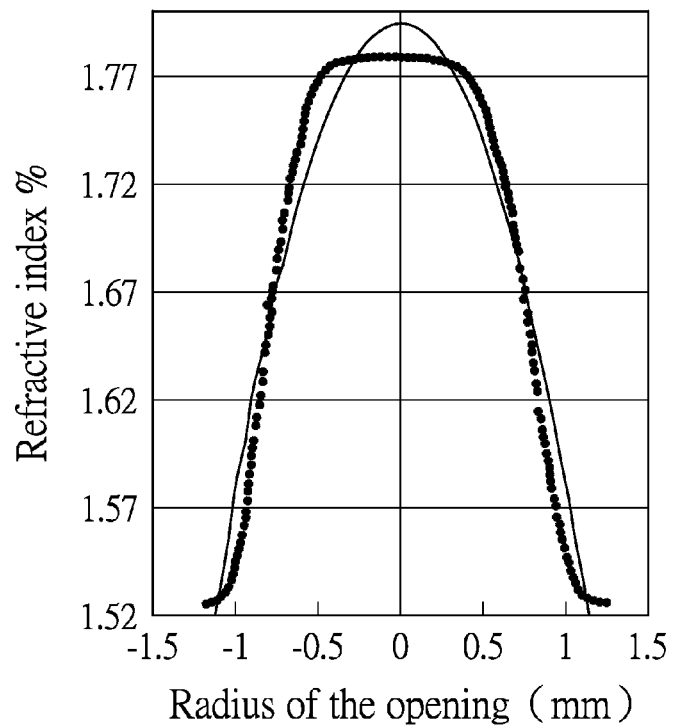
FIGS. 4A to 4D are curve fitting diagrams of the crystal liquid lens illustrating the degree of rotation of the liquid crystal molecules with respect to electric field distribution in accordance with the second embodiment of the instant disclosure.
Figure 4B:
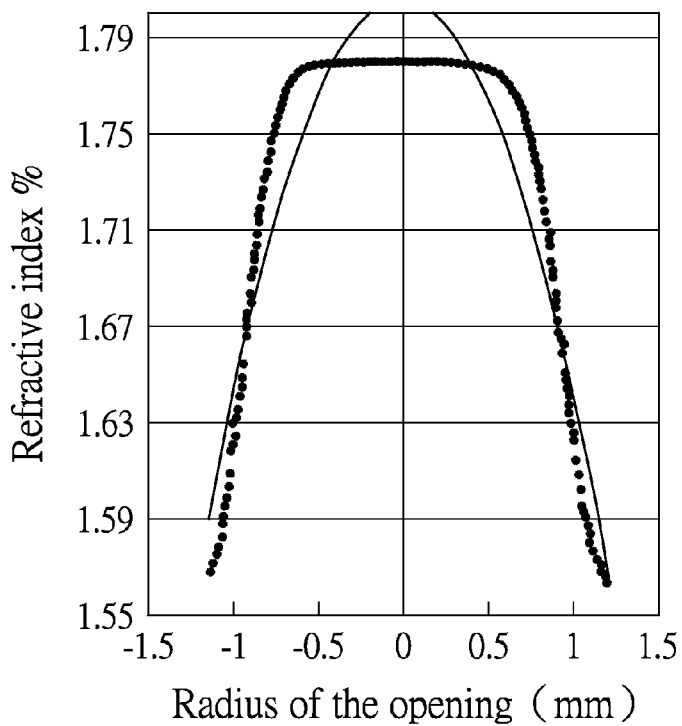
Figure 4C:
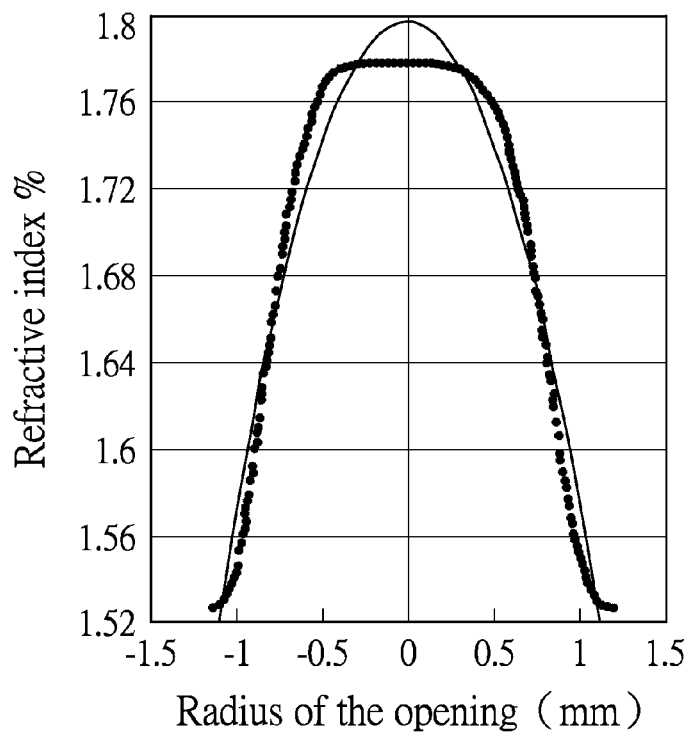
Figure 4D:
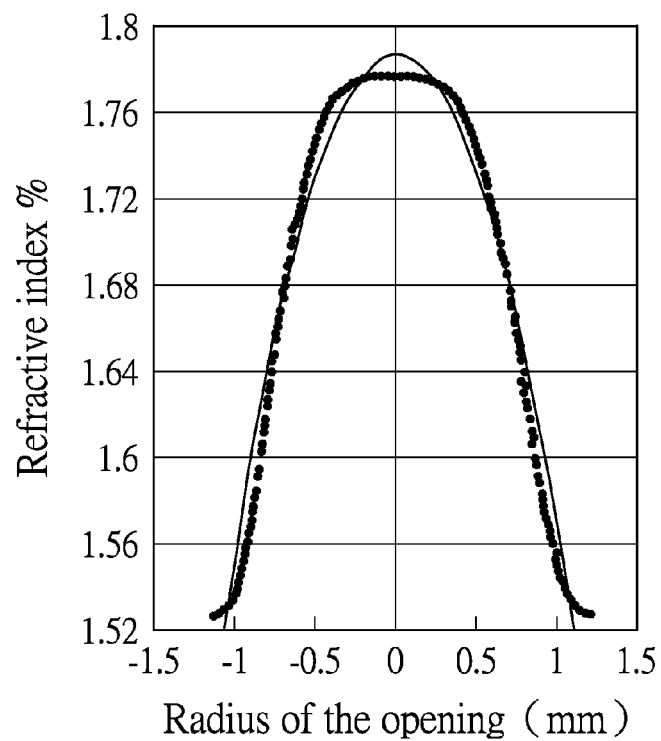

The following provides further details regarding the refractive index distribution of the liquid crystal molecules with respect to the diameter of the opening h' and other parameter. FIGS. 4A to 4D are curve fitting diagrams of the crystal liquid lens illustrating the degree of rotation of the liquid crystal molecules with respect to electric field distribution in accordance with the second embodiment of the instant disclosure. In FIGS. 4A to 4D, the thickness of the dielectric film 46' is 2.5 μm. Specifically, FIGS. 4A to 4D illustrate the extent of rotation of the liquid crystal molecules corresponding to the curve fitting diagram of electric field distribution when the gap d, first width x1, second width x2, third width x3, fourth width x4, fifth width x5, and the diameter of the circular electrode 447 are all different. FIGS. 4B and 4C illustrate the extent of rotation of the liquid crystal molecules corresponding to the curve fitting diagram of electric field distribution when various driving voltage is applied to the liquid crystal lens 1', whereas FIGS. 4A and 4D illustrate the extent of rotation of the liquid crystal molecules corresponding to the curve fitting diagram of electric field distribution at various thicknesses of the dielectric film 46'.

As shown in FIGS. 4A to 4D, the refractive index distribution of liquid crystal molecules in liquid crystal lens 1' illustrates a quadric curve with a degree of fitting at 0.9. In other words, the liquid crystal lens 1' possesses light focusing effects similar to that of a convex lens.

Please refer to FIGS. 4A and 4C. The dielectric constant of the dielectric film 46' is 100, and the gap d is 50 μm. The external power supply supplied 0V of voltage to the first electrode layer 34 and 45V of voltage to the hole-patterned electrode 441'. Figures in FIGS. 4A and 4C differs in that the first, second, third, fourth width x1, x2, x3, x4 and the diameter of the circular electrode 447 is 0.15 mm, whereas the fifth width x5 is 0.175 mm in FIG. 4A. In FIG. 4C, the first width x1 is 0.12 mm, the second width x2 is 0.14 mm, the third and fourth width x3, x4 are 0.16 mm, the fifth width x5 is 0.2 mm, and the diameter of the circular electrode 447 is 0.24 mm.

Moreover, the curve fitting diagram in FIG. 4A has a degree of fitting at 0.9562, whereas in FIG. 4C, the degree of fitting is at 0.9652. As illustrated in FIGS. 4A and 4C, the smaller the gap d, the first width x1, second width x2, third width x3, fourth width x4, and fifth width x5, the higher the degree of fitting of refractive index distribution for the liquid crystal molecules. In other words, the liquid crystal lens 1' demonstrates more preferred lens effects.

Please refer to FIGS. 4B and 4C. The dielectric constant of the dielectric film 46' is 100, and the gap d is 40 μm. The first width x1 is 0.12 mm, the second width x2 is 0.14 mm, the third and fourth width x3, x4 are 0.16 mm, the fifth width x5 is 0.2 mm, and the diameter of the circular electrode 447 is 0.24 mm. Figures in FIGS. 4B and 4C differs in that, the external power supply supplied 0V of voltage to the first electrode layer 34 and 25V of voltage to the hole-patterned electrode 441' in FIG. 4B, whereas the external power supply supplied 0V of voltage to the first electrode layer 34 and 45V of voltage to the hole-patterned electrode 441' in FIG. 4C.

Furthermore, the curve fitting diagram in FIG. 4B has a degree of fitting at 0.9011, whereas in FIG. 4C, the degree of fitting is at 0.9652. As illustrated in FIGS. 4B and 4C, the higher the voltage applied to the hole-patterned electrode 441', the higher the degree of fitting for the refractive index distribution of the liquid crystal molecules. In other words, the liquid crystal lens 1' demonstrates more preferred lens effects.

In FIGS. 4A and 4D, the first, second, third, fourth width x1, x2, x3, x4 and the diameter of the circular electrode 447 is 0.15 mm, whereas the fifth width x5 is 0.175 mm. Moreover, the external power supply supplies 0V of voltage to the first electrode layer 34 and 45V of voltage to the hole-patterned electrode 441'. The figures in FIGS. 4A and 4D differs in that the dielectric constant of the dielectric film 46' is 100 in FIG. 4A, whereas the dielectric constant of the dielectric film 46' is 150 in FIG. 4D.

In addition, the curve fitting diagram in FIG. 4A has a degree of fitting at 0.9563, whereas in FIG. 4D, the degree of fitting is at 0.973. As illustrated in FIGS. 4A and 4D, the higher the dielectric constant of the dielectric film 46', the higher the degree of fitting for the refractive index distribution of the liquid crystal molecules. In other words, the liquid crystal lens 1' demonstrates more preferred lens effects.

Notably, liquid crystal molecules can generate preferred optical lens effects by stabilizing electric field distribution and applying dielectric films having high dielectric constant with plurality of annular electrodes. As illustrated in FIGS. 2B and 4B, if the liquid crystal lenses 1 and 1' in both figures have the same thicknesses of dielectric films and same dielectric constant, the degree of fitting for the refractive index distribution of liquid crystal molecules in the liquid crystal lens 1 is relatively less than that of the liquid crystal lenses 1' having a plurality of annular electrodes. In other words, plurality of annular electrodes can lead liquid crystal molecules to generate more preferred optical lens effects. As illustrated in FIGS. 4A and 4C, the liquid crystal lens 1' generates more preferred optical lens effects when the density of the gaps between the annular electrodes is higher.

Figure 5:
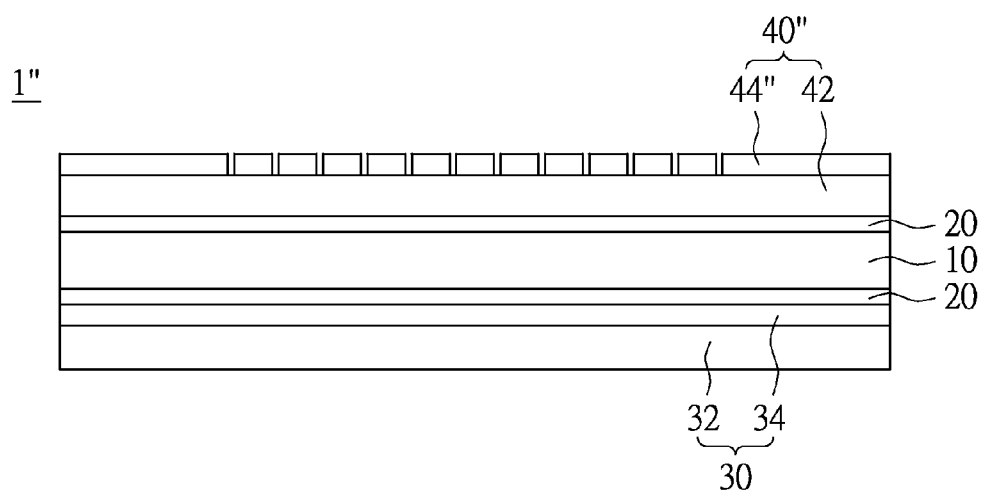
FIG. 5 is a cross-section view of the crystal liquid lens in accordance with a third embodiment of the instant disclosure.

FIG. 5 is a cross-section view of the crystal liquid lens 1" in accordance with a third embodiment of the instant disclosure. Please refer to FIG. 3A as the liquid crystal lens 1" of the instant is similar to that of the previous embodiment, which includes liquid crystal layer 10, a pair of alignment layer 20, a first electrode set 30, and a second electrode set 40". The first electrode set 30 also includes a first transparent insulating layer 32 and a first electrode layer 34. Moreover, the corresponding arrangement of each layer, thickness and materials of the layers, parameters, etc. are similar to that of the previous embodiments, and are not disclosed further.

This instant embodiment differs in that the second electrode set 40" of the liquid crystal lens 1" only includes a second electrode layer 44" and a second transparent insulating layer 42". In other words, the second electrode set 40" of the instant embodiment does not include a dielectric film. As illustrated in FIGS. 4A and 4C, the liquid crystal lens 1' generates more preferred optical lens effects when the density of the gaps between the annular electrodes is higher. In practice, when the gap of the annular electrodes ranges from 5 to 10 μm, the liquid crystal lens 1" can omit the dielectric film while maintaining preferable optical lens effects.

In summary, a liquid crystal lens of the instant disclosure includes a first electrode set, a second electrode set, and a liquid crystal layer. Electrode layer of the second electrode set includes a hole-patterned electrode, a plurality of annular electrodes, and a dielectric film. An external power supply only needs to provide driving voltage to the hole-patterned electrode and the first electrode set in order to generate electric field between the hole-patterned electrode and the first electrode set, and drive rotations of the liquid crystal molecules. The plurality of annular electrodes can induce electric field, whereas the dielectric film has a high dielectric constant to stabilize the electric field distribution, such that liquid crystal molecules can provide preferable optical lens effects.

The figures and descriptions supra set forth illustrated the preferred embodiments of the instant disclosure; however, the characteristics of the instant disclosure are by no means restricted thereto. All changes, alternations, combinations or modifications conveniently considered by those skilled in the art are deemed to be encompassed within the scope of the instant disclosure delineated by the following claims.

What is claimed is:
1. A liquid crystal lens, comprising:
   a liquid crystal layer;
   a pair of alignment layers arranged at two lateral sides of the liquid crystal layer;
   a first electrode set attached to one of the alignment layers, wherein the alignment layer is arranged between the liquid crystal layer and the first electrode set, the first electrode set includes a first transparent insulating layer and a first electrode layer, and the first electrode layer is arranged between the alignment layer and the insulating layer; and a second electrode set, comprising:
- a second transparent insulating layer;
- a second electrode layer including a hole-patterned electrode;
- a dielectric film attached to the second transparent insulating layer, the hole-patterned electrode exposing the dielectric film, the second transparent insulating layer being arranged between the second electrode layer and the other alignment layer; and
- at least one annular electrode concentrically arranged in the hole-patterned electrode, the hole-patterned electrode and the annular electrode being electrically insulated from one another, and the annular electrode being floating, wherein the hole-patterned electrode and the first electrode layer each receives a driving voltage.

2. The liquid crystal lens as recited in claim 1, wherein the dielectric film has a dielectric value ranging from 400 to 1000.

3. The liquid crystal lens as recited in claim 1, wherein the second electrode layer further comprising:
- a circular electrode concentrically arranged at a center of the annular electrode, the circular electrode and the annular electrode being electrically insulated from one another, and the circular electrode being floating.

4. The liquid crystal lens as recited in claim 3, wherein a plurality of annular electrodes, the hole-patterned electrode, and the circular electrode are concentrically arranged and are electrically insulated from one another, the annular electrodes being floating, any two adjacent annular electrodes has a gap therebetween ranging from 5 to 50 microns.

5. The liquid crystal lens as recited in claim 3, wherein the hole-patterned electrode and the annular electrode adjacent to the hole-patterned electrode have a gap therebetween, the circular electrode and the annular electrode adjacent to the circular electrode has another gap therebetween, each gap ranges from 5 to 50 microns.

6. A liquid crystal lens driven by an external power supply, comprising:
- a liquid crystal layer;
- a pair of alignment layers arranged on two lateral sides of the liquid crystal layer;
- a first electrode set including a first transparent insulating layer and a first electrode layer, wherein the first electrode layer is attached to one of the alignment layers, and the alignment layer is arranged between the liquid crystal layer and the first electrode set; and
- a second electrode set, comprising:
  - a second electrode layer including a hole-patterned electrode, a plurality of annular electrodes, and a circular electrode; wherein the hole-patterned electrode, the plurality of annular electrodes, and the circular electrode are concentrically arranged and are electrically insulated from one another, the annular electrodes arranged in the hole-patterned electrode, and each annular electrode concentrically arranged around the circular electrode; and
  - a second transparent insulating layer arranged between the second electrode layer and the other alignment layer;

wherein the hole-patterned electrode and the first electrode layer each receives a driving voltage, the annular electrodes and the circular electrodes are floating.

7. The liquid crystal lens as recited in claim 6, wherein the second electrode set includes a dielectric film, the dielectric film is arranged between the second electrode layer and the second transparent insulating layer, the dielectric film is attached to the second transparent insulating layer, the dielectric film has a dielectric value ranging from 400 to 1000.

8. The liquid crystal lens as recited in claim 6, wherein the hole-patterned electrode and the annular electrode adjacent to the hole-patterned electrode have a gap therebetween, the circular electrode and the annular electrode adjacent to the circular electrode has another gap therebetween, each gap ranges from 5 to 50 microns.

9. The liquid crystal lens as recited in claim 6, wherein any two adjacent annular electrodes have a gap therebetween ranging from 5 to 50 microns.

* * * * *